(12) United States Patent
Gordon et al.

(10) Patent No.: US 10,678,701 B2
(45) Date of Patent: Jun. 9, 2020

(54) DIRECT READ CONTROL IN A DATA STORAGE SYSTEM

(71) Applicant: Kaminario Technologies Ltd., Yokne'am Ilit (IL)

(72) Inventors: Eyal Gordon, Haifa (IL); Ilan Steinberg, Haifa (IL); Eli Malul, Tirat Carmel (IL); Shahar Salzman, Givat Ela (IL); Gilad Hitron, Haifa (IL); Eran Mann, Yoqneam (IL)

(73) Assignee: Kaminario Technologies Ltd., Yokne'am ILIT (IL)

( * ) Notice: Subject to any disclaimer, the term of this patent is extended or adjusted under 35 U.S.C. 154(b) by 0 days.

(21) Appl. No.: 16/122,309

(22) Filed: Sep. 5, 2018

(65) Prior Publication Data

US 2019/0073313 A1    Mar. 7, 2019

Related U.S. Application Data

(60) Provisional application No. 62/555,162, filed on Sep. 7, 2017.

(51) Int. Cl.
*G06F 12/10* (2016.01)
*G06F 12/14* (2006.01)
*G06F 12/1072* (2016.01)

(52) U.S. Cl.
CPC .......... *G06F 12/10* (2013.01); *G06F 12/1072* (2013.01); *G06F 12/1441* (2013.01); *G06F 12/1483* (2013.01); *G06F 2212/1016* (2013.01); *G06F 2212/1032* (2013.01); *G06F 2212/65* (2013.01); *G06F 2212/657* (2013.01)

(58) Field of Classification Search
CPC .............................. G06F 12/10; G06F 2212/65
USPC .......................................................... 711/203
See application file for complete search history.

(56) References Cited

U.S. PATENT DOCUMENTS

| | | |
|---|---|---|
| 2014/0195725 A1 | 7/2014 | Bennett |
| 2015/0286524 A1 | 10/2015 | Trantham |
| 2016/0147468 A1 | 5/2016 | Desai et al. |
| 2017/0024137 A1* | 1/2017 | Kanno .................. G06F 3/0604 |

\* cited by examiner

*Primary Examiner* — Hua J Song

(74) *Attorney, Agent, or Firm* — Wiggin and Dana LLP; Gregory S. Rosenblatt; Rikesh P. Patel

(57) ABSTRACT

The presently disclosed subject matter includes various inventive aspects, which are directed to direct read access of a host computer device to a share storage space in a data storage system, as well as control of the direct read of the host computer device by a control computer device in the data storage system.

20 Claims, 4 Drawing Sheets

US 10,678,701 B2

DIRECT READ CONTROL IN A DATA STORAGE SYSTEM

FIELD OF THE PRESENTLY DISCLOSED SUBJECT MATTER

The presently disclosed subject matter is related to the field of computer storage systems and to the implementation of direct read control in a computer storage system.

BACKGROUND

In existing storage systems with multiple storage controllers, at any given time, for every logical block address served by the system, there exist one or more controllers responsible for controlling access and managing writes to that address.

Hosts write data to the system via the storage controllers. The controllers control read and write access to the data. Logical data locations may reside in different physical locations within a shared storage space in the system. The controllers decide on the placement of data within the shared storage space, and maintain mapping information between logical addresses and physical addresses.

BRIEF DESCRIPTION

The presently disclosed subject matter includes methods and systems enabling direct read of a host computer device to a shared physical storage space and control of the direct read in a computer storage system.

According to one aspect of the presently disclosed subject matter, there is provided a data storage system comprising one or more control computer devices operatively connected to a shared physical storage space and to one or more host computer devices, each control computer device being assigned with access control and write permission to a respective storage area in the shared physical storage space, wherein a control computer device of the data storage system is configured to:

for each given write operation of writing data at a specific time to a given physical data block in the respective physical storage area accessible to the control computer device, store a generation identifier in a predefined location within the given physical data block, the generation identifier being a unique identification of the given write operation, thereby providing respective generation identifiers for distinguishing between different write operations to the given physical data block; and responsive to a direct read request from a host computer device of the one or more host computer devices to read data from the shared physical storage space, the direct read request indicative of one or more logical data blocks accessible to the host computer device, transmit metadata pertaining to the one or more logical data blocks to the host computer device, wherein the metadata includes physical location of one or more physical data blocks in the shared physical storage space corresponding to the one or more logical data blocks and an expected generation identifier of each of the one or more physical data blocks;

thereby enabling the host computer device to read data from the physical location and verify whether the read data is valid using the generation identifier.

In addition to the above features, the storage system according to this aspect of the presently disclosed subject matter can optionally comprise one or more of features (i) to (v) below, in any technically possible combination or permutation.

i. The storage system can further comprise the one or more host computer devices, wherein the host computer device can be configured to:
read data from the physical location including reading a current generation identifier from the predefined location within each of the one or more physical data blocks;
verify whether the current generation identifier matches the expected generation identifier; and
in case of a match, determine the read data is valid; otherwise, send a new direct read request to the control computer device to request updated metadata.

ii. The generation identifier can be selected from a group comprising: a write generation, a commit ID, and a timestamp value.

iii. The generation identifier can be stored at the predefined location with a predefined size.

iv. The control computer device can be further configured to store additional information pertaining to data validity at the predefined location.

v. The physical location can include an offset within a physical data block of the one or more physical data blocks and a length of the data to be read.

According to another aspect of the presently disclosed subject matter, there is provided a computerized method of direct read control of a host computer device reading from a shared physical storage space in a data storage system, the storage system comprising one or more control computer devices operatively connected to the shared physical storage space and to one or more host computer devices, each control computer device being assigned with access control and write permission to a respective storage area in the shared physical storage space, the method comprising:

for each given write operation of writing data at a specific time to a given physical data block in the respective physical storage area accessible to a control computer device, storing, by the control computer device, a generation identifier in a predefined location within the given physical data block, the generation identifier being a unique identification of the given write operation, thereby providing respective generation identifiers for distinguishing between different write operations to the given physical data block; and responsive to a direct read request from a host computer device of the one or more host computer devices to read data from the shared physical storage space, the direct read request indicative of one or more logical data blocks accessible to the host computer device, transmitting, by the control computer device, metadata pertaining to the one or more logical data blocks to the host computer device, wherein the metadata includes physical location of one or more physical data blocks in the shared physical storage space corresponding to the one or more logical data blocks and an expected generation identifier of each of the one or more physical data blocks;

thereby enabling the host computer device to read data from the physical location and verify whether the read data is valid using the generation identifier.

According to another aspect of the presently disclosed subject matter there is provided a computerized method of direct read of a host computer device to a shared physical storage space in a data storage system, the storage system comprising one or more control computer devices operatively connected to the shared physical storage space and to one or more host computer devices including the host computer device, each control computer device being assigned with access control and write permission to a respective storage area in the shared physical storage space, the method being performed by the host computer device and comprising:

sending a direct read request to a control computer device of the one or more control computer devices, the direct read request indicative of one or more logical data blocks accessible to the host computer device;

receiving, from the control computer device, metadata pertaining to the one or more logical data blocks, wherein the metadata includes physical location of one or more physical data blocks on the shared physical storage space corresponding to the one or more logical data blocks and an expected generation identifier of each of the one or more physical data blocks, wherein, responsive to each given write operation for writing data at a specific time to a given physical data block in the respective physical storage area accessible to the control computer device, a generation identifier is stored in a predefined location within the given physical data block, the generation identifier being a unique identification of the given write operation, thereby providing respective generation identifiers for distinguishing between different write operations to the given physical data block;

reading data from the physical location including reading a current generation identifier from the predefined location within each of the one or more physical data blocks;

verifying whether the current generation identifier matches the expected generation identifier; and in case of a match, determining the read data is valid; otherwise, sending a new direct read request to the control computer device to request updated metadata.

According to another aspect of the presently disclosed subject matter there is provided a non-transitory computer readable storage medium tangibly embodying a program of instructions that, when executed by a computer, causing the computer to perform a method of direct read control of a host computer device reading from a shared physical storage space in a data storage system, the storage system comprising one or more control computer devices operatively connected to the shared physical storage space and to one or more host computer devices, each control computer device being assigned with access control and write permission to a respective storage area in the shared physical storage space, the method being performed by a control computer device in the data storage system and comprising:

for each given write operation of writing data at a specific time to a given physical data block in the respective physical storage area accessible to the control computer device, storing a generation identifier in a predefined location within the given physical data block, the generation identifier being a unique identification of the given write operation, thereby providing respective generation identifiers for distinguishing between different write operations to the given physical data block; and responsive to a direct read request from a host computer device of the one or more host computer devices to read data from the shared physical storage space, the direct read request indicative of one or more logical data blocks accessible to the host computer device, transmitting metadata pertaining to the one or more logical data blocks to the host computer device, wherein the metadata includes physical location of one or more physical data blocks in the shared physical storage space corresponding to the one or more logical data blocks and an expected generation identifier of each of the one or more physical data blocks;

thereby enabling the host computer device to read data from the physical location and verify whether the read data is valid using the generation identifier.

According to another aspect of the presently disclosed subject matter there is provided a non-transitory computer readable storage medium tangibly embodying a program of instructions that, when executed by a computer, cause the computer to perform a method of direct read of a host computer device to a shared physical storage space in a data storage system, the storage system comprising one or more control computer devices operatively connected to the shared physical storage space and to one or more host computer devices including the host computer device, each control computer device being assigned with access control and write permission to a respective storage area in the shared physical storage space, the method comprising:

sending a direct read request to a control computer device of the one or more control computer devices, the direct read request indicative of one or more logical data blocks accessible to the host computer device;

receiving, from the control computer device, metadata pertaining to the one or more logical data blocks, wherein the metadata includes physical location of one or more physical data blocks on the shared physical storage space corresponding to the one or more logical data blocks and an expected generation identifier of each of the one or more physical data blocks, wherein, responsive to each given write operation for writing data at a specific time to a given physical data block in the respective physical storage area accessible to the control computer device, a generation identifier is stored in a predefined location within the given physical data block, the generation identifier being a unique identification of the given write operation, thereby providing respective generation identifiers for distinguishing between different write operations to the given physical data block;

reading data from the physical location including reading a current generation identifier from the predefined location within each of the one or more physical data blocks;

verifying whether the current generation identifier matches the expected generation identifier; and in case of a match, determining the read data is valid; otherwise, sending a new direct read request to the control computer device to request updated metadata.

The computerized methods, and the non-transitory computer readable storage media disclosed herein according to various aspects, can optionally further comprise one or more of features (i) to (v) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
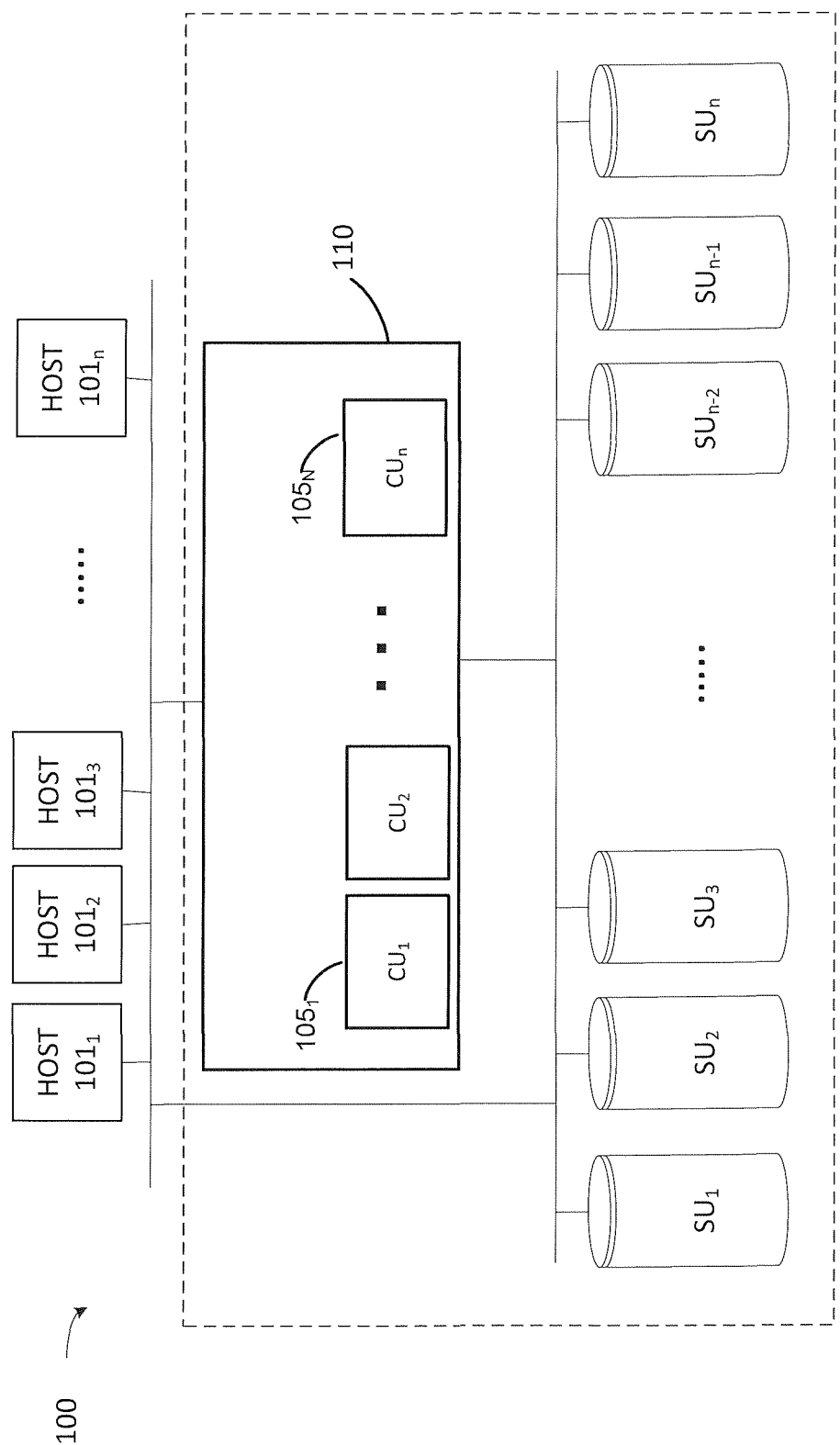
FIG. 1 is a schematic block diagram illustration of a computer storage system according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Unless specifically stated otherwise, as apparent from the following discussions, it is appreciated that throughout the specification discussions utilizing terms such as "storing", "reading", "writing", "transmitting", "enabling", "sending", "receiving", "verifying", "matching", "determining", "controlling", or the like, include actions and/or processes of a computer that manipulate and/or transform data into other data, said data represented as physical quantities, e.g. such as electronic quantities, and/or said data representing the physical objects.

The terms "computer", "computer device", "control unit", "controller", "server" or the like as disclosed herein should be broadly construed to include any kind of electronic device with data processing circuitry, which includes a computer processing device configured and operable to execute computer instructions stored, for example, on a computer memory being operatively connected thereto. Examples of such a device include: a digital signal processor (DSP), a microcontroller, a field programmable gate array (FPGA), an application specific integrated circuit (ASIC), a laptop computer, a personal computer, a smartphone, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 3:
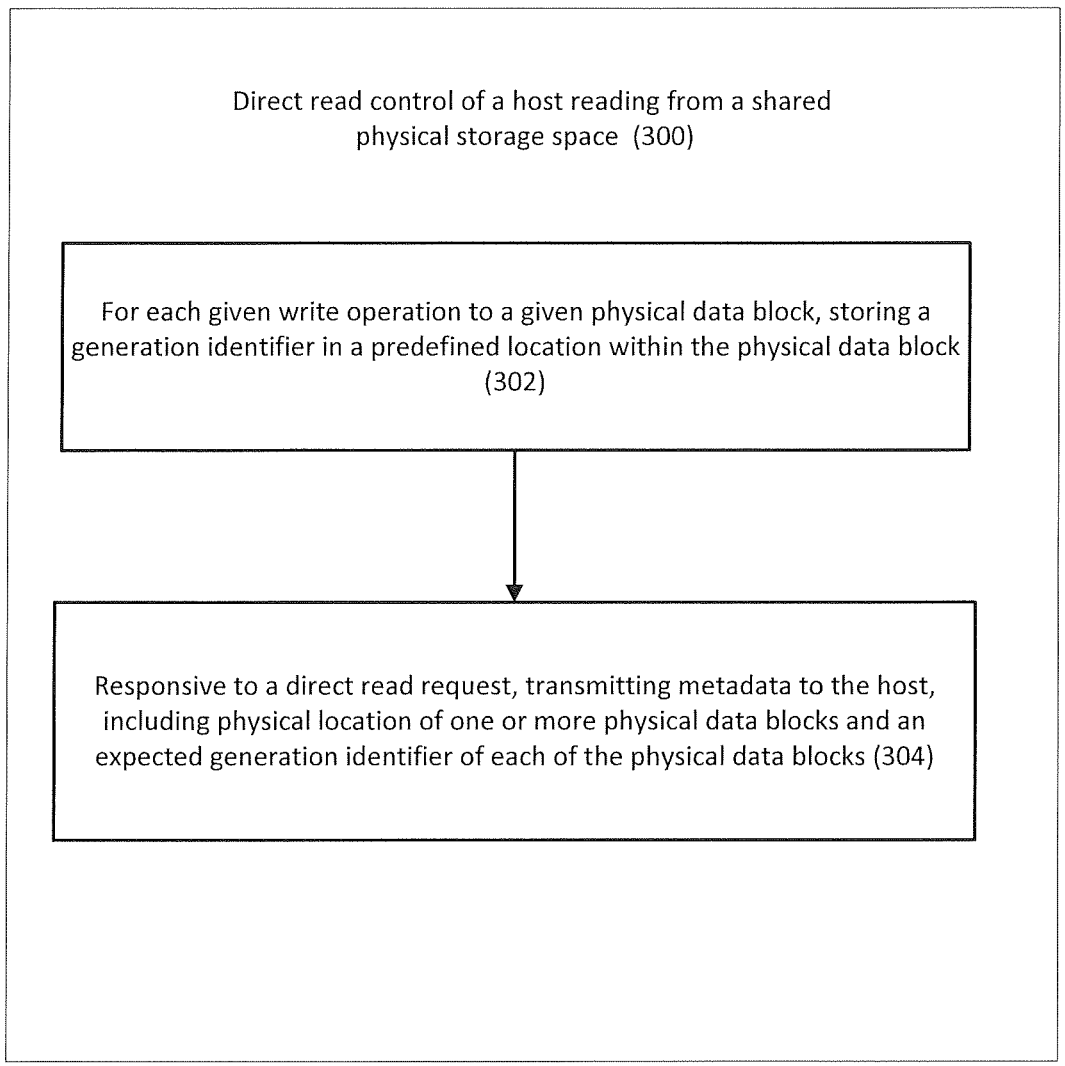
FIG. 3 is a generalized flowchart showing a sequence of operations performed for direct read control of a host computer device reading from a shared physical storage space in a data storage system, according to some examples of the presently disclosed subject matter.
Figure 4:
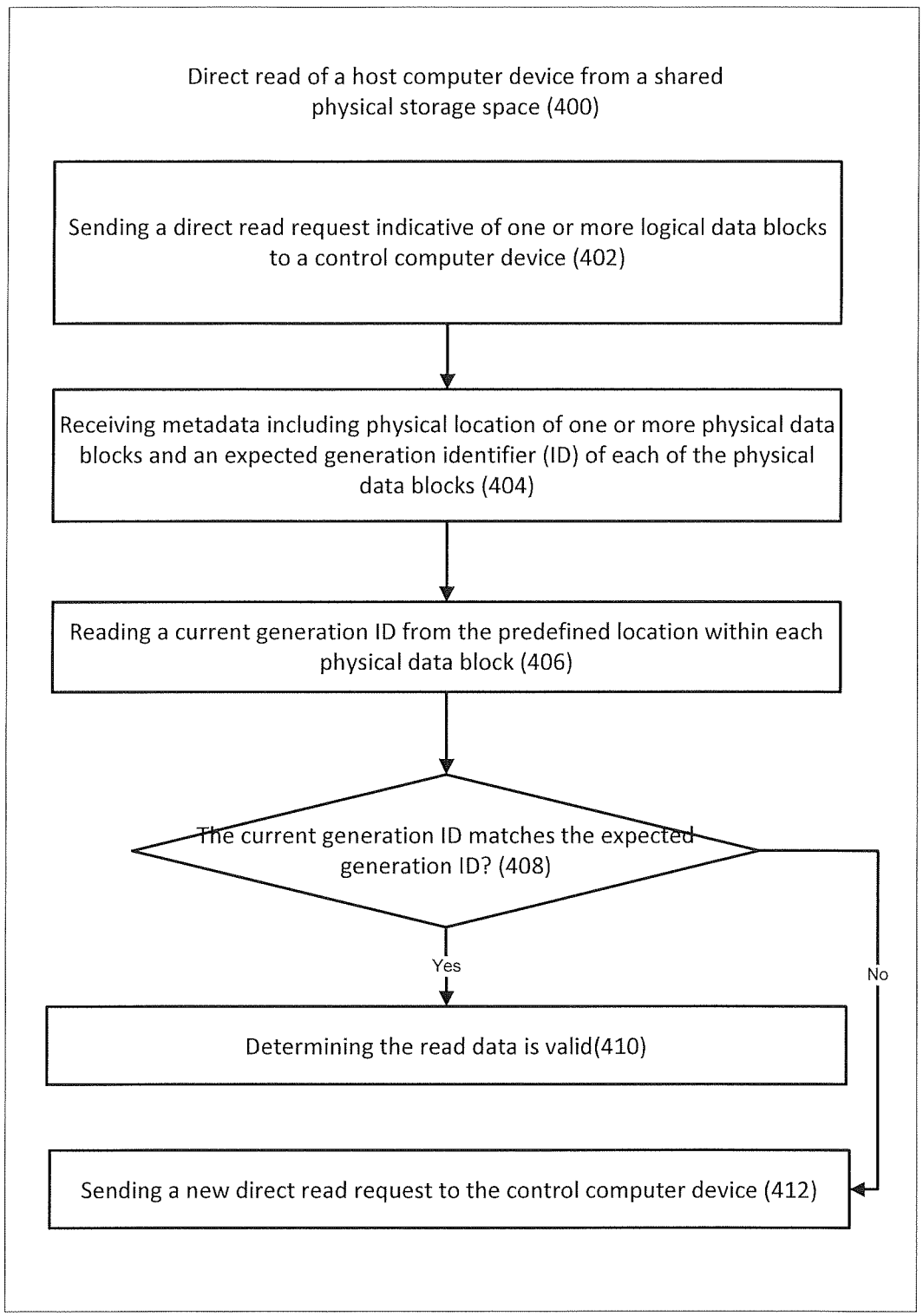
FIG. 4 is a generalized flowchart showing a sequence of operations performed in a direct read of a host computer device from the shared physical storage space in a data storage system, according to some examples of the presently disclosed subject matter.

In embodiments of the presently disclosed subject matter, fewer, more and/or different stages than those shown in FIG. 3 and FIG. 4 may be executed. In embodiments of the presently disclosed subject matter, one or more stages illustrated in FIG. 3 and FIG. 4 may be executed in a different order and/or one or more groups of stages may be executed simultaneously.

FIG. 1 to FIGS. 2A and 2B illustrate various aspects of the system architecture in accordance with some examples of the presently disclosed subject matter. Elements in FIG. 1 to FIGS. 2A and 2B can be made up of a combination of software and hardware and/or firmware that performs the functions as defined and explained herein. Elements in FIG. 1 to FIGS. 2A and 2B may be centralized in one location or dispersed over more than one location. In other examples of the presently disclosed subject matter, the system may comprise fewer, more, and/or different elements than those shown in FIG. 1 to FIGS. 2A and 2B. For example, some components of control unit 105 can be implemented as a separate unit in interface layer 110 or implemented on an external server or be otherwise operatively connected to the storage system for enabling management of I/O operations.

Throughout the description and the claims, reference is made to the term "logical unit" (or "LU" in abbreviation, also known as "volume" or "logical volume"). The term logical unit is known in the art of computer storage, and the following definition is provided as a non-limiting example only for convenience purposes. Storage systems are often logically divided into logical units (LUs) to obtain a partitioned storage where each LU can be presented and accessed as a separate device. Each logical unit is identified by a respect logical unit number (LUN). For example, according to the small system computer interface (SCSI) standard, a SCSI initiator in a host originates an I/O command sequence that is transmitted to a SCSI target endpoint or recipient storage device. A logical unit is an entity within the SCSI target that responds to the SCSI I/O command.

The term "logical block address" (LBA) or "logical address" (LA) as used herein, relates to the basic reference unit which is used by external hosts to address I/O requests to the storage system. LBAs can be numerical and range from 1-n. A partly or an entirely overlapping LBA range (e.g., 1-n) can be used with multiple, different LUs (e.g., all the LUs) in the storage system, and therefore in order to reference a specific logical block, a reference to the LU with which the logical block is associated may be required. For simplicity, in some examples in the description the I/O requests may reference LBA, and the existence of multiple LUs in the storage system is not mentioned. It would be appreciated that this omission is made with the intention of simplifying the description of the examples of the presently disclosed subject matter, and is not intended to limit the scope of the description. Therefore, it would be appreciated that examples of the presently disclosed subject matter contemplate a multi-LU storage system and that the LBAs which are referred to herein can be comprised of a combination of an LBA and a LU ID (e.g., LU number).

Bearing the above in mind, attention is drawn to FIG. 1, which is a schematic block diagram of a computer storage system, according to some examples of the presently disclosed subject matter. Storage system 100 (e.g. a distributed data storage system) includes a shared physical storage space comprising one or more physical storage units ($SU_{1-n}$), each physical storage unit comprising one or more storage devices. Storage devices may be any one of Hard Storage devices (HDD) or Solid State Drives (SSD, comprising for example, a plurality of NAND elements), DRAM, non-volatile RAM, or any other computer storage device or combination thereof. Physical storage units ($SU_{1-n}$) can be consolidated in a single unit, or can be otherwise distributed over one or more computer nodes connected by a computer network. It is to be noted that the storage system described herein refers to a block storage system where data is stored in blocks and can be accessed by their block address.

Storage system 100 can further comprise an interface layer 110 comprising one or more control units (also referred to herein as control computer devices) $105_{1-n}$ operatively connected to the shared physical storage space and to one or more hosts (also referred to herein as host computer devices) $101_{1-n}$, and configured to control and execute various operations in the storage system (including, e.g., input and/or output (I/O) requests and/or operations). Various examples of control units are described in more detail below.

Interface layer 110 can be further configured to provide a virtual storage layer logically representing the physical storage space as well as the required mapping between the physical storage space and its respective logical representation. Different control units $105_{1-n}$ in the interface layer 110 (where a control unit is implemented, in some examples, by a dedicated computer device, e.g., a dedicated computer server device) can be assigned for managing the operation of a certain area within the physical storage space (e.g. an area comprising, for example, one or more designated physical storage units or part thereof).

According to certain embodiments of the presently disclosed subject matter, the Interface layer 110 can be further configured to control direct access (e.g., direct read access) of hosts $101_{1-n}$ to the shared physical storage space, as described in detail below with reference to FIGS. 2A and 2B.

Communication between hosts $101_{1-n}$ and interface layer 110, between interface layer 110 and storage units $SU_{1-n}$, between hosts $101_{1-n}$ and storage units $SU_{1-n}$, and within interface layer 110 (e.g., between different control unit $105_{1-n}$) can be realized by any suitable infrastructure and protocol. Hosts ($101_{1-n}$) can be connected to the interface layer 110 and/or storage units $SU_{1-n}$ directly or through a network (e.g. over the Internet). According to one example, communication between various elements of storage system 100 is implemented with a combination of Fiber Channel (e.g. between hosts and interface layer 110), SCSI (e.g. between interface 110 and storage units) and InfiniBand (e.g. interconnecting different control units in interface 110) communication protocols.

Figure 2A:
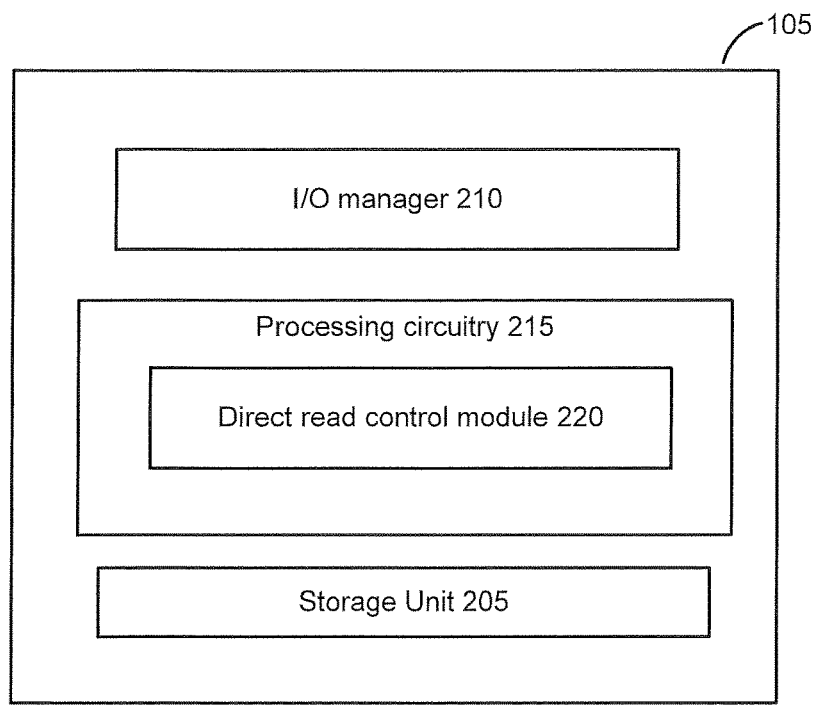
FIG. 2A is a schematic block diagram showing some components of a control unit according to some examples of the presently disclosed subject matter.

FIG. 2A is a schematic block diagram showing some components of a control unit according to some examples of the presently disclosed subject matter. Control unit 105 can be implemented on a computer device comprising a processing circuitry 215. The processing circuitry 215 is configured to provide all processing necessary for the control unit to function as further detailed below with reference to FIG. 3. The processing circuitry 215 comprises or is otherwise operatively connected to one or more computer processors (not shown separately) and memory (not shown separately). The processor(s) of processing circuitry 215 can be configured to execute one or more functional modules in accordance with computer-readable instructions implemented on a non-transitory computer-readable memory comprised in the processing circuitry. Such functional module(s) are referred to hereinafter as comprised in the processing circuitry.

The control unit 105 can further comprise, by way of example, an I/O manager 210 configured to handle I/O requests and metadata/data request received, for example, from host computer devices $101_{1-n}$, and a storage unit 205 configured to store data and/or metadata, configurations and/or logic which are used by the I/O manager 210 and the processing circuitry 215. According to some examples of the presently disclosed subject matter, the processing circuitry 215, the storage unit 205, and I/O manager 210 can be operatively connected to each other.

According to some embodiments, functional module(s) comprised in the processing circuitry can include a Direct Read Control module 220 configured to control direct read of a host computer device to the shared physical storage space in a data storage system as described below with reference to FIG. 3. In one embodiment, the Direct Read Control module 220 is configured to control a direct read of the host computer device to the shared physical storage space, thereby enabling the host to read data directly from the shared physical storage space and be able to verify whether the read data is valid (e.g., the correct or most updated data), as will be detailed below.

According to some embodiments, I/O manager 210 can be implemented as one or more components distributed over more than one control unit. According to some examples, each control unit can comprise a respective I/O manager 210, while according to other examples, one I/O manager may be accessible and operable by more than one control unit. According to some examples, some components of control unit 105 can be implemented as a separate unit in interface layer 110 or implemented on an external server, or be otherwise operatively connected to the storage system for enabling management of I/O operations. For example, the Direct Read Control module 220 can be implemented as a separate unit operatively connected to I/O manager 210.

As mentioned above, according to certain embodiments, the presently disclosed subject matter contemplates a distributed storage system with an interface layer 110 configured with multiple control units ($105_1$ to $105_n$ as indicated in FIG. 1). As would be apparent to any person skilled in the art, principles described with respect to a single control unit herein can likewise apply to two or more control units in system 100.

In some cases, host computer devices can be configured to read data from the shared physical storage space via the control units (i.e., indirect access). In such cases, control units $101_{1-n}$ can be adapted to read data and/or metadata from the storage space (i.e., $SU_{1-n}$). According to examples of the presently disclosed subject matter, the logical address space of the storage system 100 can be logically partitioned so that at a given time, for every logical address, there is at least one control unit which is responsible for controlling access and managing write operations to that logical address (e.g., the logical data stored thereon). Such control unit is assigned for handling read and write requests directed to that address, and is also referred to as the owner controller or owner control unit for that logical address.

Control units can hold translation tables or implement translation functions which map from the logical address to the physical storage space. In some examples (e.g. for the purpose of redundancy and/or efficiency), two or more control units can be assigned to handle I/O requests to the same physical storage area. In some examples, there are at least two control units that are each assigned to handle I/O requests to respective non-overlapping storage areas, such that one control unit cannot access the storage area assigned to the other control unit, and vice versa. In such cases, only a single control unit of the at least two control units is assigned with access to a given physical storage area. In other words, there is at least one control unit assigned with access control to a respective physical storage area which is not accessible to at least one other control unit.

In response to receiving an I/O request, the control unit can be configured to determine with which address (LU, LBA) the I/O request is associated. The control unit can use address mapping tables (or mapping functions) to determine, based on the logical address referenced in the I/O request, to which storage location in the physical storage to address the I/O request.

According to some embodiments of the presently disclosed subject matter, in order to gain performance, it is desired to enable direct access of hosts to the shared physical storage space, e.g., to enable them to read data directly from the shared storage space, after initially consulting the control units (i.e., the owner controller) for metadata pertaining to a certain logical address. In such cases, control units $101_{1-n}$, in particular, the Direct Read Control module 220 thereof, can be adapted to, in response to a direct read access request from the host computer device, transmit relevant metadata to the host computer device, thereby enabling the host computer device to directly read from the physical storage space.

In some cases, the data to be read (also referred to as the target data or requested data) may be moved or overwritten before the host reads it. For example, between a first time point when the host receives the metadata from the owner controller and a second time point when the host actually access the physical location and reads data therefrom, the physical data blocks originally storing the target data may already be re-written, or the target data may be updated and moved to another physical location. Being unaware of such changes, the host may read invalid data without knowing it is not the correct data. In the case where the host caches the metadata after receiving it from the owner controller for future uses, the risk of the host reading invalid data is enlarged.

A common solution to this problem is to maintain some kind of locking mechanism (or reference count) on the data. For instance, once the owner controller receives a direct read request from a host reader, it locks the data from being changed, until the host completes the read process and notifies the owner controller to unlock the data. However, this may cause latency in the system. In addition, in case of a host failure, the data may be locked for a long period of time without any other entities being able to access it. Another solution, in addition or in lieu of the above solution, can be that whenever the data is changed, the owner controller explicitly notify host readers that the metadata they received is no longer valid (i.e., invalidate the metadata cache within readers). This can be costly and may slow down read/write operations thus affect performance in the system.

In order to reduce the risk of the host reading invalid data while not affecting system performance, there is proposed a mechanism of maintaining consistent metadata which enables the verification of data validity. According to certain embodiments, a control computer device in the data storage system (e.g., one of control units $101_{1-n}$), in particular, the Direct Read Control module 220 thereof, can be configured to, for each given write operation of writing data at a specific time to a given physical data block in the respective physical storage area accessible to the control computer device, store a generation identifier (ID) in a predefined location within the given physical data block. The generation identifier is a unique identification of the given write operation. Therefore, respective generation identifiers are provided for distinguishing between different write operations to the given physical data block.

The Direct Read Control module 220 can be further configured to, responsive to a direct read request from the host computer device to read data from the shared physical storage space (the direct read request indicative of one or more logical data blocks accessible to the host computer device), transmit metadata pertaining to the one or more logical data blocks to the host. The metadata includes physical location of one or more physical data blocks in the shared physical storage space corresponding to the one or more logical data blocks and an expected generation identifier of each of the one or more physical data blocks. This enables the host to read the target data from the physical location and verify whether the read data is valid or not using the generation identifier, as will be described in further detail with reference to FIG. 3.

Figure 2B:
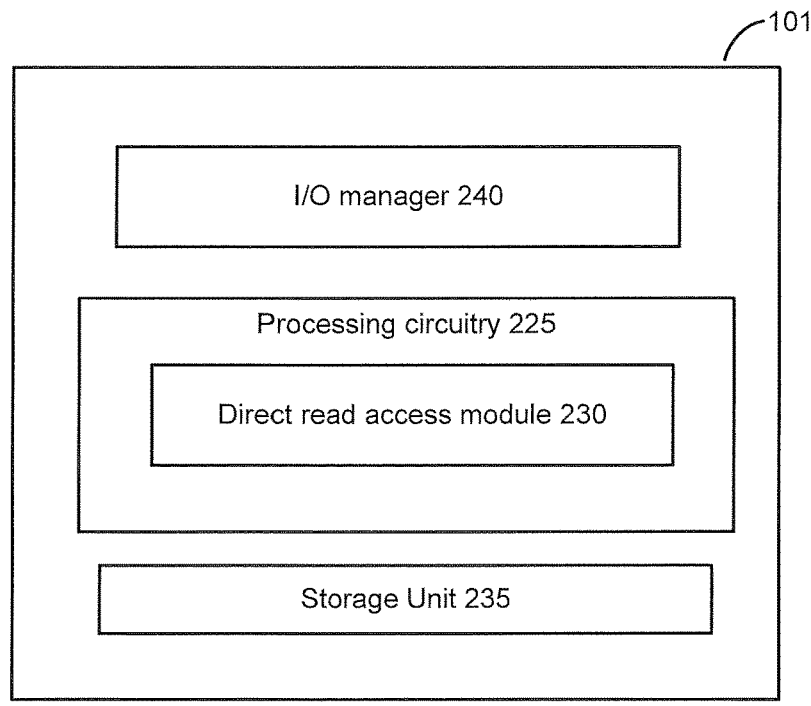
FIG. 2B is a schematic block diagram showing some components of a host computer device according to some examples of the presently disclosed subject matter.

Turning now to FIG. 2B, there is illustrated a schematic block diagram showing some components of a host computer device according to some examples of the presently disclosed subject matter. A host 101 can be implemented on a computer device comprising a processing circuitry 225. The processing circuitry 225 is configured to provide all processing necessary for the host to function as further detailed below with reference to FIG. 4. The processing circuitry 225 comprises or is otherwise operatively connected to one or more computer processors (not shown separately) and memory (not shown separately). The processor(s) of processing circuitry 225 can be configured to execute one or more functional modules in accordance with computer-readable instructions implemented on a non-transitory computer-readable memory comprised in the processing circuitry. Such functional module(s) are referred to hereinafter as comprised in the processing circuitry.

The host 101 can further comprise, by way of example, an I/O manager 240 configured to send I/O requests and/or data/metadata requests, for example, to control units $105_{1-n}$ as well as send and/or receive data with respect to the physical storage space. The host 101 can further comprise a storage unit 235 configured to store data and/or metadata, and configurations and/or logic which are used by the I/O manager 240 and the processing circuitry 225. According to some examples of the presently disclosed subject matter, the processing circuitry 225, the storage unit 235, and I/O manager 240 can be operatively connected to each other.

According to some embodiments, functional module(s) comprised in the processing circuitry can comprise a Direct Read Access module 230 configured to directly read from the shared physical storage space in a distributed storage system as described below with reference to FIG. 4.

As mentioned above, in certain embodiments, the presently disclosed subject matter contemplates a distributed storage system with an interface layer 110 configured with multiple control units ($105_1$ to $105_n$ as indicated in FIG. 1). One or more host computer devices 101 can be operatively connected to the interface layer. In certain embodiments, the distributed storage system can comprise the one or more host computer devices. One or more of the host computer devices can be cloud based. As would be apparent to any person skilled in the art, principles described with respect to a single host computer device herein can likewise apply to two or more host computer devices.

In some cases, host computer devices can be configured to read data from the shared physical storage space via the control units (i.e., indirect access). According to certain embodiments of the presently disclosed subject matter, in order to improve performance, host computer devices can be configured to directly read data from the shared physical storage space, in addition to or in lieu of the indirect access. In addition, as further disclosed herein, in order to avoid reading invalid data in the case of direct access, the host can use metadata to verify the validity of the data, as described in detail below.

According to certain embodiments, the Direct Read Access module 230 can be configured to send the direct read request to the control computer device (the direct read request indicative of one or more logical data blocks accessible to the host computer device); receive, from the control computer device, the metadata pertaining to the one or more logical data blocks including physical location of one or more physical data blocks corresponding to the one or more logical data blocks and an expected generation identifier of each of the one or more physical data blocks; read the data from the physical location; and verify the validity of the read data using the generation identifier, as will be described in further detail with reference to FIG. 4. Having provided a high level description of the various components of the storage system, more details are now provided with respect to operation of the storage system.

FIG. 3 is a generalized flowchart showing a sequence of operations performed for direct read control of a host computer device reading from a shared physical storage space in a data storage system, according to some examples of the presently disclosed subject matter.

Operations described with reference to FIG. 3 can be executed for example, by interface layer 110 and more specifically by one or more of the control units 105 described above. It should be appreciated, that while some operations are described with reference to system 100 and control computer device 105 and components thereof presented above, this is done by way of example only, and this should not be construed to limit the operations to being implemented on such components alone.

As described above, the data storage system described herein comprises one or more control units (also referred to herein as control computer devices) and a shared physical storage space operable by the control computer devices. The one or more control computer devices can be operatively connected to the shared physical storage space and to one or more host computer devices. The shared physical storage space can comprise one or more storage devices. Each control computer device can be assigned with access control and write permission to a respective physical storage area in the storage system. Since the logical address space of the storage system is logically partitioned, for each given logical address, there is at least one control computer device which is responsible for that address (e.g., the data stored thereon) and assigned for handling I/O requests (e.g., read and write requests) directed to that address. Such control computer device is also referred to as the owner or owner controller or owner control unit for that logical address. Each host computer device has access to one or more logical blocks in one or more logical volumes in the storage system.

A direct read of a host computer device of the one or more host computer devices can be controlled (300) by a control computer device (e.g., by the Direct Read Control module 220 of a control unit 105 as illustrated in FIG. 2A) to directly read target data from the shared physical storage space. Control of the direct read process can comprise operations as described below.

For each given write operation of writing data at a specific time to a given physical data block in the respective physical storage area accessible to the control computer device, a generation identifier (ID) can be stored (302), by the control computer device, in a predefined location within the given physical data block. The generation identifier is a unique identification of the given write operation. Therefore, respective generation identifiers can be provided for distinguishing between different write operations to the given physical data block.

In some embodiments, the generation identifier can be selected from a group comprising: a write generation, a commit ID, and a timestamp value. The term write generation(s) is known in the field and can be used in the present disclosure to refer to generations of data written into a certain physical location (i.e., the given physical data block) by different write operations. A write generation number can indicate an instance of writing to the given physical data block and can be used as the generation ID. In some cases, a control computer device can be configured to aggregate multiple write operations received in a given period of time and perform aggregated write to free storage space. A commit ID refers to an aggregated write identifier of a given controller. Since there can be multiple controllers in the data storage system, the generation ID can be, e.g., a combination of a given controller ID and a commit ID of that given controller. Alternatively, since different write operations to a given physical data block are performed at different time points, a timestamp value indicative of a specific time that a given write operation is performed on the physical data block can be used as the generation ID.

It is to be noted that the above examples of a generation ID are provided for illustrative and exemplary purposes, and should not be construed to limit the present disclosure in any way. Other suitable identifiers capable of uniquely identifying different write operations can be used in addition or in lieu of the above.

According to certain embodiments, the generation identifier can be stored at a predefined location of a given physical data block with a predefined size. By way of example, a data block can be in the size of 4,096 bytes, and the generation ID can be in the size of 8 bytes. In one example, the generation ID can be stored as a prefix placed at the beginning of the data block.

In some embodiments, the data to be read in the physical storage space may not be completely aligned with physical data blocks. In other words, the placement of the requested data in the physical storage space may take less than entire/complete data blocks. For instance, the starting point of the requested data does not necessarily have to be at the beginning of a physical data block, but can be, e.g., in the middle of the physical data block (i.e., having an offset within the physical data block). In such cases, the physical location of the requested data can include an offset within a physical data block of the one or more physical data blocks and a length of the requested data. One possible reason for causing such misalignment can be data compression. Another possible reason for misalignment can be that the physical data block is in a different size from the logical data block in the interface layer. For instance, the logical data blocks can be in the size of 1 KB, whereas the physical storage uses 4 KB physical data blocks.

A direct read request from the host computer device can be received by the control computer device. The direct read request is indicative of one or more logical data blocks (corresponding to the target data to be read by the host computer device) accessible to the host computer device.

In response to receiving the direct read request, metadata pertaining to the one or more logical data blocks can be transmitted (304) by the control computer device to the host computer device. The metadata includes physical location of one or more physical data blocks in the shared physical storage space corresponding to the one or more logical data blocks and an expected generation identifier of each of the one or more physical data blocks. The expected generation identifier is a generation ID that the host expects to see in the predefined location of a given physical data block when it reads data from the given physical data block, as described below with reference to blocks 406 and 408 in FIG. 4.

The control computer device that receives the direct read request and transmits the metadata is normally the owner controller assigned with access control and write permission to the one or more logical data blocks such that it can provide the metadata needed to the host computer device. In some cases, the read request can be received by a different control computer device which is not the owner controller of the one or more logical data blocks. In such cases, the different control computer device can identify that it does not have access control to these data blocks and can transfer the read request to the owner controller for further processing. Alternatively, the different control computer device can obtain the requested metadata from the owner controller and send it to the host that requests it. Transmission of the metadata can enable the host computer device to read data from the physical location and verify whether the read data is valid using the generation identifier, as described in further detail with reference to FIG. 4.

Turning now to FIG. 4, there is illustrated a generalized flowchart showing a sequence of operations performed in a direct read of a host computer device from the shared physical storage space in a data storage system, according to some examples of the presently disclosed subject matter.

Operations described with reference to FIG. 4 can be executed for example, by one of the host computer devices 101 described above. It should be appreciated, that while some operations are described with reference to system 100 and host computer device 101 and components thereof presented above, this is done by way of example only, and this should not be construed to limit the operations to being implemented on such components alone.

As described above, the data storage system described herein comprises one or more control computer devices operatively connected to a shared physical storage space and to one or more host computer devices. Components and configurations of the data storage system are described in detail with reference to FIG. 3 and FIG. 1, which are not repeated here for the purpose of brevity and simplicity of the description.

A direct read (also referred to as direct read access) from the shared physical storage space can be performed (400) by a host computer device of the one or more host computer devices. Specifically, data can be directly read (e.g., by the Direct Read Access module 230 of a host computer device 101 as illustrated in FIG. 2B) from the shared physical storage space and the validity of the read data can be verified. The direct read can comprise operations as described below.

When a host computer device intends to read certain data from the shared physical storage space, a direct read request can be sent (402) by the host computer device to the interface layer 110 (e.g., a control computer device in the interface layer that is responsible for handling the read request). The direct read request is indicative of one or more logical data blocks (corresponding to the target data to be read by the host computer device) accessible to the host computer device.

Upon the metadata transmission by the control computer device, as described with reference to block 304, the metadata pertaining to the one or more logical data blocks can be received (404) by the host computer device from the control computer device. As described above, the metadata includes physical location of one or more physical data blocks in the shared physical storage space corresponding to the one or more logical data blocks and an expected generation identifier of each of the one or more physical data blocks. Using the metadata, the target data can be read (406) by the host computer device from the physical location, including reading a current generation identifier from the predefined location within each of the one or more physical data blocks. The current generation identifier is the generation ID that is currently stored in the physical data block at the time point of the host reading the data. In some cases, it can be an updated generation ID as compared to the expected generation ID which was transmitted to the host at the time point of acknowledging the read request of the host. For instance, there may be write operation(s) performed with respect to the given physical data block between the time points of the host requesting and actually reading the data. In some other cases, the current generation ID can be the same as the expected generation ID, e.g., when there is no write operation directed to that physical data block between the two time points.

Accordingly, it can be verified (408), by the host computer device, whether the current generation identifier matches the expected generation identifier. In case of a match, it can be determined (410) that the read data is valid. Otherwise (i.e., there is no match), a new direct read request can be sent by the host computer device to the control computer device to request updated metadata. For instance, the requested data may be moved and/or updated to a new physical location. The updated metadata including the new physical location can be transmitted to the host computer device. By verifying the generation ID, the risk of the host reading invalid target data can be effectively reduced, without affecting the performance of the system.

According to certain embodiments, additional information pertaining to data validity can be stored at the predefined location of a physical data block. For instance, the additional information can include a checksum of the data in the physical data block. This can be beneficial, e.g., especially in the case of an unintended system incident, such as a system fault or disk failure, etc. In such cases, certain data on the physical blocks may be possibly changed without affecting the generation ID, therefore additional measure for verifying data validity can be needed.

It is to be noted that the direct read access of the host computer device to the shared physical storage space as well as the control thereof by the control computer device, as described with reference to FIGS. 3-4, can be implemented in addition to or in lieu of the indirect read described above. The distributed storage system can be configured in different ways to enable direct and/or indirect read access of at least some of the host computer devices. By way of example, certain host computer devices can be restricted to have only indirect access or direct access, while some others can have both types of access.

It is also to be noted that in some embodiments, the data storage system can comprise the one or more control computer devices 105 with functionalities thereof described with reference to FIG. 3 and the shared physical storage space operatively connected thereto. In some embodiments, the data storage system can comprise the one or more control computer devices 105, the shared physical storage space, and the one or more host computer devices 101 with functionalities thereof described with reference to FIG. 4.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

What is claimed:

1. A data storage system comprising one or more control computer devices operatively connected to a shared physical storage space and to one or more host computer devices, each control computer device being assigned with access control and write permission to a respective physical storage area in the shared physical storage space, wherein a control computer device of the data storage system is configured to:
   for each given write operation of writing data at a specific time to a given physical data block in the respective physical storage area accessible to the control computer device, store a generation identifier in a predefined location within the given physical data block, the generation identifier being a unique identification of the given write operation, thereby providing respective generation identifiers for distinguishing between different write operations to the given physical data block; and
   responsive to a direct read request from a host computer device of the one or more host computer devices to read data from the shared physical storage space, the direct read request indicative of one or more logical data blocks accessible to the host computer device, transmit metadata pertaining to the one or more logical data blocks to the host computer device, wherein the metadata includes physical location of one or more physical data blocks in the shared physical storage space corresponding to the one or more logical data blocks and an expected generation identifier of each of the one or more physical data blocks;
   thereby enabling the host computer device to read data from the physical location and verify whether the read data is valid using the generation identifier;
   wherein the data storage system further comprises the one or more host computer devices, wherein the host computer device is configured to:
   read data from the physical location including reading a current generation identifier from the predefined location within each of the one or more physical data blocks;
   verify whether the current generation identifier matches the expected generation identifier; and
   in case of a match, determine the read data is valid; otherwise, send a new direct read request to the control computer device to request updated metadata.

2. The data storage system of claim 1, wherein the generation identifier is selected from a group comprising: a write generation, a commit ID, and a timestamp value.

3. The data storage system of claim 1, wherein the generation identifier is stored at the predefined location with a predefined size.

4. The data storage system of claim 1, wherein the control computer device is further configured to store additional information pertaining to data validity at the predefined location.

5. The data storage system of claim 1, wherein the physical location includes an offset within a physical data block of the one or more physical data blocks and a length of the data to be read.

6. A computerized method of direct read control of a host computer device reading from a shared physical storage space in a data storage system, the data storage system comprising one or more control computer devices operatively connected to the shared physical storage space and to one or more host computer devices, each control computer device being assigned with access control and write permission to a respective storage area in the shared physical storage space, the method comprising:
   for each given write operation of writing data at a specific time to a given physical data block in the respective physical storage area accessible to a control computer device, storing, by the control computer device, a generation identifier in a predefined location within the given physical data block, the generation identifier being a unique identification of the given write operation, thereby providing respective generation identifiers for distinguishing between different write operations to the given physical data block; and
   responsive to a direct read request from a host computer device of the one or more host computer devices to read data from the shared physical storage space, the direct read request indicative of one or more logical data blocks accessible to the host computer device, transmitting, by the control computer device, metadata pertaining to the one or more logical data blocks to the host computer device, wherein the metadata includes physical location of one or more physical data blocks in the shared physical storage space corresponding to the one or more logical data blocks and an expected generation identifier of each of the one or more physical data blocks;
   thereby enabling the host computer device to read data from the physical location and verify whether the read data is valid using the generation identifier;
   wherein the enabling comprises enabling the host computer device to:
   read data from the physical location including reading a current generation identifier from the predefined location within each of the one or more physical data blocks;
   verify whether the current generation identifier matches the expected generation identifier; and
   in case of a match, determine the read data is valid; otherwise, send a new direct read request to the control computer device to request updated metadata.

7. The computerized method of claim 6, wherein the generation identifier is selected from a group comprising: a write generation, a commit ID, and a timestamp value.

8. The computerized method of claim 6, wherein the generation identifier is stored at the predefined location with a predefined size.

9. The computerized method of claim 6, further comprising storing additional information pertaining to data validity at the predefined location.

10. The computerized method of claim 6, wherein the physical location includes an offset within a physical data block of the one or more physical data blocks and a length of the data to be read.

11. A non-transitory computer readable storage medium tangibly embodying a program of instructions that, when executed by a computer, causing the computer to perform a method of direct read control of a host computer device reading from a shared physical storage space in a data storage system, the data storage system comprising one or more control computer devices operatively connected to the shared physical storage space and to one or more host computer devices, each control computer device being assigned with access control and write permission to a respective storage area in the shared physical storage space, the method being performed by a control computer device in the data storage system and comprising:

for each given write operation of writing data at a specific time to a given physical data block in the respective physical storage area accessible to the control computer device, storing a generation identifier in a predefined location within the given physical data block, the generation identifier being a unique identification of the given write operation, thereby providing respective generation identifiers for distinguishing between different write operations to the given physical data block; and responsive to a direct read request from a host computer device of the one or more host computer devices to read data from the shared physical storage space, the direct read request indicative of one or more logical data blocks accessible to the host computer device, transmitting metadata pertaining to the one or more logical data blocks to the host computer device, wherein the metadata includes physical location of one or more physical data blocks in the shared physical storage space corresponding to the one or more logical data blocks and an expected generation identifier of each of the one or more physical data blocks;

thereby enabling the host computer device to read data from the physical location and verify whether the read data is valid using the generation identifier;

wherein the enabling comprises enabling the host computer device to:

read data from the physical location including reading a current generation identifier from the predefined location within each of the one or more physical data blocks;

verify whether the current generation identifier matches the expected generation identifier; and in case of a match, determine the read data is valid; otherwise, send a new direct read request to the control computer device to request updated metadata.

12. The storage medium of claim 11, wherein the generation identifier is selected from a group comprising: a write generation, a commit ID, and a timestamp value.

13. The storage medium of claim 11, wherein the generation identifier is stored at the predefined location with a predefined size.

14. The storage medium of claim 11, wherein the method further comprises storing additional information pertaining to data validity at the predefined location.

15. The storage medium of claim 11, wherein the physical location includes an offset within a physical data block of the one or more physical data blocks and a length of the data to be read.

16. A non-transitory computer readable storage medium tangibly embodying a program of instructions that, when executed by a computer, causing the computer to perform a method of direct read of a host computer device to a shared physical storage space in a data storage system, the data storage system comprising one or more control computer devices operatively connected to the shared physical storage space and to one or more host computer devices including the host computer device, each control computer device being assigned with access control and write permission to a respective storage area in the shared physical storage space, the method comprising:

sending a direct read request to a control computer device of the one or more control computer devices, the direct read request indicative of one or more logical data blocks accessible to the host computer device;

receiving, from the control computer device, metadata pertaining to the one or more logical data blocks, wherein the metadata includes physical location of one or more physical data blocks on the shared physical storage space corresponding to the one or more logical data blocks and an expected generation identifier of each of the one or more physical data blocks, wherein, for each given write operation of writing data at a specific time to a given physical data block in the respective physical storage area accessible to the control computer device, a generation identifier is stored in a predefined location within the given physical data block, the generation identifier being a unique identification of the given write operation, thereby providing respective generation identifiers for distinguishing between different write operations to the given physical data block;

reading data from the physical location including reading a current generation identifier from the predefined location within each of the one or more physical data blocks;

verifying whether the current generation identifier matches the expected generation identifier; and in case of a match, determining the read data is valid; otherwise, sending a new direct read request to the control computer device to request updated metadata.

17. The storage medium of claim 16, wherein the generation identifier is selected from a group comprising: a write generation, a commit ID, and a timestamp value.

18. The storage medium of claim 16, wherein the generation identifier is stored at the predefined location with a predefined size.

19. The storage medium of claim 16, wherein the method further comprises storing additional information pertaining to data validity at the predefined location.

20. The storage medium of claim 16, wherein the physical location includes an offset within a physical data block of the one or more physical data blocks and a length of the data to be read.

* * * * *